Dec. 7, 1943.  J. W. JEWELL ET AL  2,336,017
ACCUMULATOR FOR FINELY DIVIDED SOLIDS
Filed Dec. 28, 1940
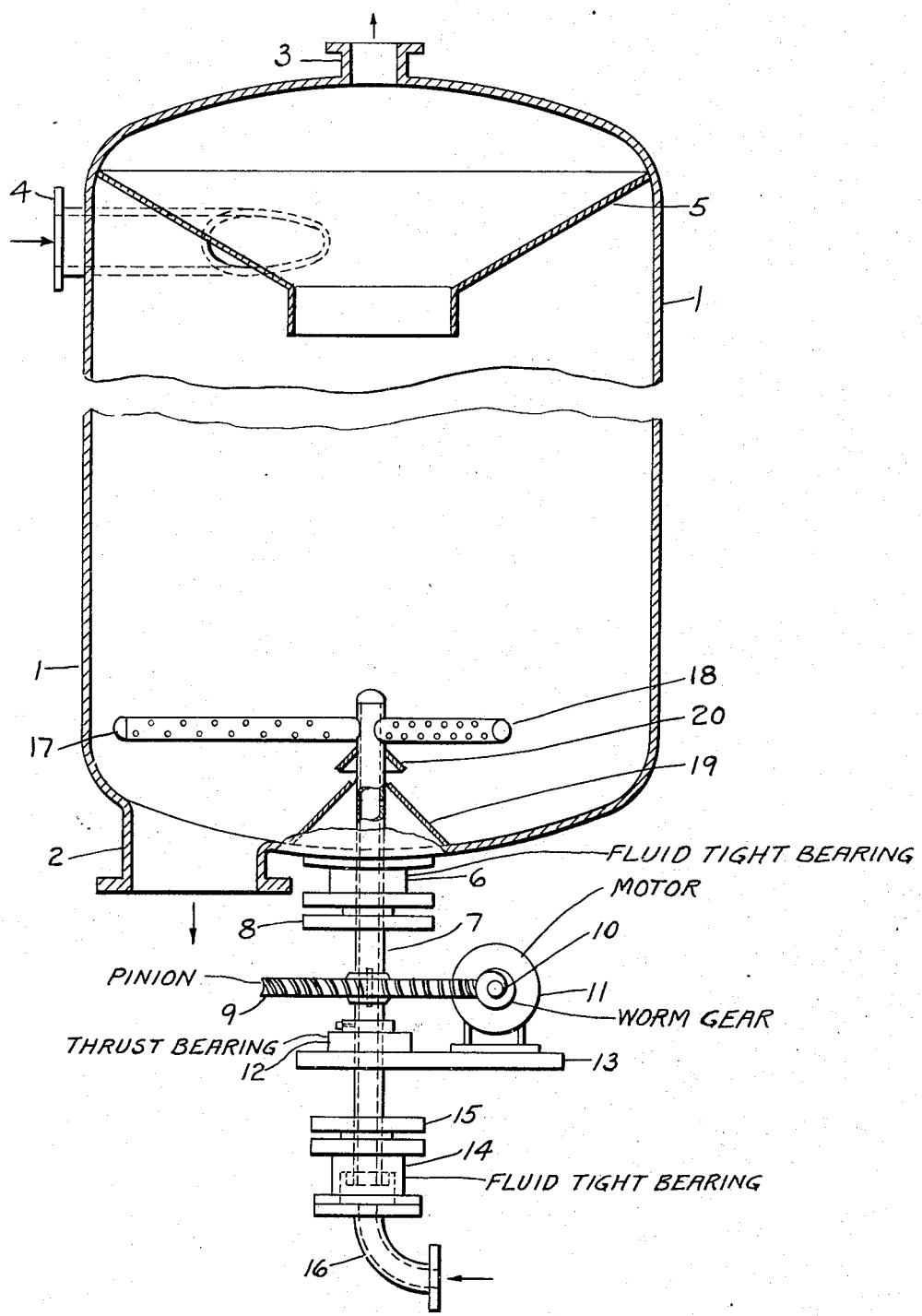
JOSEPH W. JEWELL
OSCAR G. MELCHIOR
INVENTORS
BY E. F. Liebrecht
ATTORNEY Patented Dec. 7, 1943

2,336,017

UNITED STATES PATENT OFFICE 2,336,017

ACCUMULATOR FOR FINELY DIVIDED SOLIDS

Joseph W. Jewell, Summit, and Oscar G. Melchior, Hohokus, N. J., assignors to The M. W. Kellogg Company, Jersey City, N. J., a corporation of Delaware Application December 28, 1940, Serial No. 372,092

4 Claims. (Cl. 34—10)

This invention relates to materials handling, and particularly to apparatus for handling and transporting finely divided solid material. Although not limited thereto, the invention is of particular value in connection with catalytic processes wherein an aerated or suspended powdered catalyst flows more or less continuously as a pseudo-fluid through one or more processing steps.

In process involving flow of material to and from a plurality of stages of treatment, it frequently happens that momentarily or for short periods the rate at which a material is being introduced into a given stage is greater or less than the rate at which the said material is being delivered to that stage from the preceding one. It is then extremely desirable to provide a certain amount of flexibility in the coupling of the two stages; that is, to provide space wherein momentary excesses of material can be held until the succeeding stage is able to consume them. This flexibility is of course easily managed where the material is a liquid, for example, by the use of accumulators or surge drums as is common in oil refinery practice; or where the material is entirely gaseous, gas holders may be used as is done with domestic fuel gas. Where the ability of a material to flow depends upon the presence of gas in motion, however, none of the usual expedients is suitable.

When finely divided solids come substantially to rest in a container for a short period, it may be very difficult to withdraw them from the container and aerate them again. Many of such materials have angles of repose approaching 90°, and tend to bridge over an opening in a container through which they are desired to flow. This may occur even when the walls of the container slope steeply to the edge of the opening. There has not heretofore been any satisfactory method of overcoming these tendencies.

One of the objects of our invention is to provide means which, in combination with a container for finely divided solids, will enable uniform aerated flow of solids from the bottom of the container to be established and maintained without interruption due to bridging, packing or other refusal of the material to flow.

Another object of our invention is to provide an improved apparatus for conferring pseudo-fluidity upon finely divided solids accumulated in a container.

A further object of our invention is to afford means for uniformly subjecting a stream of finely divided solids to the flushing and stripping action of a gaseous medium while the flow of the stream is retarded. Other objects will appear from the more detailed description of the invention hereinafter given.

In order to accomplish the objects of our invention we provide a containing vessel having means for the deposition therein of finely divided solids. The vessel has an outlet, preferably located in the lowermost portion, for the withdrawal of solids therefrom by gravity flow. Additional connections to the vessel include an inlet at any suitable point for an aerating gas and a gas outlet, the latter located well above the level to which it is contemplated that the vessel shall be filled with solids. The aerating gas inlet connects within the vessel with a gas distributing element such as a straight, curved or branched tube or tubes, perforated or terminating in one or more nozzles. The distributing element is so connected to the aerating gas inlet as to be capable of movement; at least some of the nozzles, perforations or other means for the escape of gas from the element into the vessel are capable of being moved so as to cover or sweep substantially an entire horizontal cross-sectional plane in the vessel, said plane being closely adjacent the bottom of the vessel and the outlet for the withdrawal of solids. A means for moving the distributing element in the manner described completes the most essential features of our invention.

As is well known to those skilled in the art, it is not possible to impart complete pseudo-fluidity to a large body of solid particles without substantially uniform movement of an actual fluid (in this case a gas) therethrough.

Where the cross-sectional area of the path of the fluidizing gas through the solids is great, as in a vessel large enough to serve as an accumulator, and when the solids are substantially at rest, the requisite uniformity of flow is very difficult to establish and maintain. An additional difficulty is then encountered, in that localized momentary high gas velocity within the mass of solid particles tends to aggravate and stabilize itself by blowing so-called "rat-holes" or channels through the mass, into which the bulk of the gas will then be diverted. The provision of even a large number of fixed inlets for the gas has not proven a satisfactory solution of this problem, because once a channel starts to form, the decreased resistance to flow offered thereby will cause the gas to by-pass those inlets which are distant from the point of incipient channeling. It is true that sufficiently rapid movement of the gas will avoid channeling for the most part, but then large amounts of solids will be carried away by the gas as it escapes from the upper surface of the mass of solids.

The operation of our accumulator, having a movable gas distributing element therein, is such as to produce substantially uniform aeration in a relatively large body of finely divided solids with a small flow of aerating gas and to permit withdrawal of the solids as desired without the occurrence of bridging or holdup.

It will be apparent that the invention disclosed herein is capable of receiving a variety of mechanical expressions, one of which, for the purpose of illustrating the invention, is shown in the accompanying drawing in side elevation, with portions cut away to expose interior features.

In the drawing, the numeral 1 designates a containing vessel of cylindrical shape, closed at both ends. The flanged outlet nozzle 2 in the bottom head of the vessel is for the withdrawal of finely divided solids accumulated in the vessel, and a similar outlet 3 in the top of the vessel is for the escape of gas. The modification of our invention described is intended to receive a flowing stream of finely divided solids in an aerated or suspended condition, and in order that the solids may come to rest in the vessel we provide a tangential inlet nozzle and an annular shaped deflecting cone or baffle 5, which two elements cooperate to impart a rotary motion to the entering stream and by centrifugal action de-aerate the solids in known manner. The solid component of the stream then drops into the lower portion of the vessel while the gaseous component traverses the opening in the cone 5 and leaves the vessel through outlet 3.

In lieu of the integral de-aerator shown in the drawing, a separate de-aerating device such as a cyclone could be used. The cone 5 could then be entirely omitted and the inlet nozzle 4 made radial rather than tangential, solids being introduced in that case by means such as a screw conveyor receiving the solids as discharged from the cyclone. The use of our improved accumulator in the preferred form incorporating de-aerating means, however, avoids the necessity of employing a screw conveyor or other separate transporting device and obviates the possibility of a hold-up occurring in the discharge outlet from a separate de-aerating device.

Centrally located in the bottom head of the vessel 1 is a bearing 6 carrying a hollow shaft 7 and equipped with a packing gland 8 for making a fluid-tight seal between the outer surface of the shaft and the inner surface of the bearing. Externally of the vessel 1 the hollow shaft 7 is surrounded by and keyed to a pinion 9, which engages a worm gear 10 driven by a motor 11. A thrust bearing 12 supports the shaft 7, it and the motor 11 being in turn supported by a bed plate 13 which may rest upon any suitable foundation. Below thrust bearing 12 the shaft 7 passes through and terminates within a second fluid-tight bearing 14 and accessory packing gland 15. Access of gaseous material to the interior of shaft 7 is thereby provided from a fixed inlet nozzle 16, capable of being connected to a gas supply main.

Shaft 7 extends through the bearing 6 and into the interior of vessel 1 for a short distance, and is closed at the inside end. Adjacent the end of the shaft are attached three radial distribution tubes, lying in a plane normal to the axis of shaft 7 and set 60° apart. In the drawing, two of these tubes are numbered 17 and 18 respectively, the third being concealed from view by the latter two. The three tubes have hollow interiors which communicate with the central passageway in shaft 7, are closed at their outer ends, and are perforated at numerous points. The lengths of the tubes are equal and all extend to within a few inches of the wall of the vessel.

In order to prolong the life of the bearing 6 we surround shaft 7 with a hollow protecting cone 19 which is sealed to the bottom of the vessel along its lower edge and which bears closely against the shaft along its upper truncated edge. A second hollow cone 20 surrounds the shaft 7 and is fastened thereto along its upper truncated edge. Cone 20 is concentric with cone 19 and overlaps it like a skirt. The two cones serve to prevent solid particles from working into bearing 6 and impairing its friction-reducing capacity, and their efficacy is enhanced by bleeding a small amount of gas through perforations in shaft 7 into the space between the shaft, cone 19 and shell 1. This gas escapes into the interior of the vessel through the small clearance between the upper truncated edge of cone 19 and shaft 7.

In operating the modification of our invention illustrated, an aerated or suspended stream of finely divided solids enters through inlet 4 and is largely freed of its carrying gas by rapid rotary motion around the annular baffle 5, whereat the solids drop into the lower portion of vessel 1 while the aerating or suspending gas exits through outlet 3. A body of the entering solid material is maintained in the vessel as a reserve against suddenly increased withdrawal, or as an accumulation from a short period of reduced withdrawal. The ability of the contents of the vessel to flow by gravity out through nozzle 2 is maintained at all times by supplying a suitable gas, such as steam, to the distribution tubes including tubes 17 and 18 through the shaft 7 and inlet connection 16. Shaft 7 is given an intermittent or continuous rotary motion by motor 11 acting through gear 10 and pinion 9. The distribution tubes turn with shaft 7, meanwhile emitting a plurality of jets of aerating gas through their perforations, as a result of which all solid material adjacent the plane of rotation of the tubes is aerated substantially uniformly while being stirred and shaken down by the motion of the tubes and the jets of gas. The movement of the jets effectively prevents channeling.

The rate of withdrawal of solids through outlet nozzle 2 will be subject to control by means of a slide valve or the like connected thereto, or by varying the speed of a screw conveyor or solids pump having its intake directly below outlet 2.

Our invention is especially advantageous in connection with conversion processes employing a flowing stream of finely powdered catalyst of which certain catalytic hydrocarbon cracking processes are typical. A catalyst is suspended in or fluidized by hydrocarbon vapors, and the pseudo-fluid thus formed is passed through a conversion zone wherein cracking occurs. During the cracking reaction the catalyst particles acquire a carbonaceous deposit which must be removed before the catalyst can be reused. Upon completion of the reaction, most of the gaseous conversion products may be separated from the spent catalyst merely by centrifugal action, as is provided by the tangential nozzle 4 and the baffle 5 in the upper portion of our apparatus. Minor amounts of hydrocarbons, however, attach themselves to the catalyst more firmly or are entrapped between catalyst particles and can only be removed by the stripping action of steam or other inert gas. Such removal is essential and must be complete, not only to avoid loss of valuable products but also because subsequent combustion of the catalyst to remove carbonaceous deposits would be complicated by the presence of excess combustible matter. Our apparatus is of utility as a combined stripping vessel and accumulator, as the rotation of the gas distributing tubes insures uniform and thorough stripping throughout a mass of material held in the accumulating vessel. We may introduce a suitable stripping gas such as steam at an elevated temperature through the inlet 16, which effects stripping simultaneously with the fluidizing action already described.

It will be understood that the shape and arrangement of the elements of the apparatus shown are purely exemplary, as numerous other designs may be used within the scope of our invention. For example, we find it possible in some cases to arrange the perforations in our distributing tubes in such manner that the jets of gas issuing therefrom will, by their reaction thereon, provide motive power for rotating the tubes; this effect, similar to that employed in a reaction turbine, is obtained by locating all the perforations in each tube along a straight line and directing them all in the same angular direction.

The distributing tubes employed in accordance with our invention may be bent at any desired angle, and may be more or less in number than in the drawing. The shaft 7 may enter the vessel from the top or side instead of the bottom; and the movement of the distributing tubes may also be different, so long as the gas jets sweep a cross-section of the vessel in a plane near the bottom and the outlet as hereinbefore described.

We claim:

1. A method of continuously stripping finely divided solids of volatile substances entrapped therein and held thereon which comprises continuously introducing into and passing said solids slowly downward through a vessel of relatively large cross-sectional area, introducing an inert gas at an elevated temperature into the lower portion of said vessel and there releasing it into said solids at a plurality of points, and constantly changing the positions of the gas-release points throughout the entire cross-sectional area of the vessel whereby said solids are uniformly permeated by upwardly flowing inert gas and stripped of said volatile substances, and continuously withdrawing the stripped finely divided solids from said vessel.

2. An accumulator for finely divided solids adapted to receive a stream of said finely divided solids suspended in a gas and to contain and maintain a body of said solids in an aerated condition which comprises a containing vessel having at least its upper portion in the form of a vertical cylinder, and having a tangential inlet into its upper portion for the introduction of a suspension of finely divided solids in gas, an annular shaped baffle and a gas outlet separated from said inlet by said baffle, said tangential inlet and said baffle being so arranged as to impart a rotary motion to a stream of suspended material entering through said inlet and to separate the solid component of such a stream from the gaseous component by centrifugal action, an outlet for solids situated in the lower portion of said vessel, movable means for releasing gas at a plurality of points in the lower portion of said vessel, and means for moving said last-mentioned means so that said gas release points traverse closed paths adjacent the lower inner surfaces of said vessel.

3. In a solids-handling system involving flowing finely divided solids along a confined path in an aerated condition, the method of accumulating and maintaining a body of solids substantially at rest but in an aerated gravity-flowable condition which comprises flowing solids suspended in a gas tangentially into the upper portion of an accumulating vessel and deflecting said suspended solids into rotary movement in said vessel to effect centrifugal separation of said solids from the suspending gas, allowing said solids to come substantially to rest in the lower portion of said vessel, introducing gas at a plurality of points into a body of solids accumulated in the lower portion of said vessel, constantly changing the positions of said gas release points throughout substantially the entire cross-section of said vessel to maintain said accumulated solids in a sufficiently uniformly aerated condition to permit gravity flow thereof, withdrawing gas from said vessel, and withdrawing accumulated solids from the lower portion of said vessel by gravity flow.

4. A continuous process for stripping powdered catalyst of volatile material adsorbed thereon or entrained therewith which comprises introducing said powder into and gravitating it downwardly through a vessel of relatively large cross-sectional area, introducing an inert gas at an elevated temperature into the lower portion of said vessel and there releasing it into said solids at a plurality of points and in an amount sufficient to maintain the mass of powder thereabove in a pseudo-fluid readily flowable condition and to strip the volatile material therefrom, and constantly changing the positions of the gas release points throughout the entire cross-sectional area of the vessel whereby said mass of powder is uniformly permeated by the upwardly flow of inert gas, and continuously withdrawing stripped powder from said vessel.

JOSEPH W. JEWELL.
OSCAR G. MELCHIOR.